# (12) United States Patent
Morris et al.

(10) Patent No.: US 7,353,536 B1
(45) Date of Patent: Apr. 1, 2008

(54) METHODS OF RESETTING PASSWORDS IN NETWORK SERVICE SYSTEMS INCLUDING USER REDIRECTION AND RELATED SYSTEMS AND COMPUTER-PROGRAM PRODUCTS

(75) Inventors: Scott Morris, Atlanta, GA (US); William Conner, Roswell, GA (US)

(73) Assignee: AT&T Delaware Intellectual Property, Inc, Wilmington, DE (US)

( * ) Notice: Subject to any disclaimer, the term of this patent is extended or adjusted under 35 U.S.C. 154(b) by 856 days.

(21) Appl. No.: 10/669,399

(22) Filed: Sep. 23, 2003

(51) Int. Cl.
*G06F 21/20* (2006.01)
*G06F 21/22* (2006.01)
*G06K 19/00* (2006.01)

(52) U.S. Cl. .......................... 726/6; 709/203; 709/222; 709/225; 713/2; 713/155; 713/164; 713/168; 713/183; 713/184; 726/7; 726/8

(58) Field of Classification Search .................... None
See application file for complete search history.

(56) References Cited

U.S. PATENT DOCUMENTS

| | | | | |
|---|---|---|---|---|
| 5,638,448 A * | 6/1997 | Nguyen | ........................ | 380/29 |
| 5,719,941 A * | 2/1998 | Swift et al. | .................. | 713/155 |
| 6,226,383 B1 * | 5/2001 | Jablon | ........................ | 380/30 |
| 6,405,318 B1 * | 6/2002 | Rowland | ..................... | 726/22 |
| 6,728,884 B1 * | 4/2004 | Lim | ............................ | 726/12 |
| 6,732,278 B2 * | 5/2004 | Baird et al. | ..................... | 726/7 |
| 6,848,997 B1 * | 2/2005 | Hashimoto et al. | ........... | 463/42 |
| 2002/0171546 A1 * | 11/2002 | Evans et al. | ................. | 340/540 |

OTHER PUBLICATIONS

Bielawski, et al, 'Engineering Application Using COTS Components: An In-House Development Alternative', Noblis Technology Summaries, Summer 2003 Edition, entire document, http://www.noblis.org/Publications/SigmaSummer2003_4.pdf.*
W. Townsley et al; Memo from Network Working Group entitled Layer Two tunneling Protocol ""L2TP"" (Aug. 1999).
C. Rigney et al; Memo from Network Working Group entitled Remote Authentication Dial in User Service (Radius) (Jun. 2000).
C. Rigney et al; Memo from Network Working Group entitled ""RADIUS Accounting"" (Jun. 2000).

* cited by examiner

*Primary Examiner*—Nasser Moazzami
*Assistant Examiner*—Ronald Baum
(74) *Attorney, Agent, or Firm*—Myers Bigel Sibley & Sajovec, P.A.

(57) ABSTRACT

Resetting a password for a network service account may include redirecting the user to a password reset tool, wherein the user is blocked from network access other than the password reset tool while being redirected. After redirecting the user to the password reset tool, user entry of verification information may be accepted, and the verification information from the user may be compared with known verification information for the user. User entry of a new password may be accepted if the verification information accepted from the user matches the known verification information for the user; and the new password may be stored as the known password for the user. Related systems and computer-program products are also discussed.

51 Claims, 4 Drawing Sheets

METHODS OF RESETTING PASSWORDS IN NETWORK SERVICE SYSTEMS INCLUDING USER REDIRECTION AND RELATED SYSTEMS AND COMPUTER-PROGRAM PRODUCTS

FIELD OF THE INVENTION

The present invention relates to the field of network communications, and more particularly to passwords for network communications.

BACKGROUND OF THE INVENTION

When providing network access, a service provider may require a user to provide authentication before providing network access. For example, a user may be required to provide a username and a password before the service provider will allow access to the network. More particularly, an Internet Service Provider (ISP) may provide Internet access via digital subscriber line (DSL), dial up, and/or cable modem for subscribers having service accounts with the ISP, and the ISP may require a subscriber to Log-In by entering a username and password before providing access to the Internet. Authentication and/or Log-In prior to network use can be used by the service provider, for example, to deny network access to unauthorized users (i.e. those without a subscription), to determine usage of subscribers for billing purposes, to deny access when a subscriber has not paid a bill, and/or to enhance security.

Many ISP's provide a customer service channel, such as a Help Desk, so that subscribers can obtain assistance with network usage. For example, an ISP may have customer service representatives available to answer telephone calls from subscribers needing assistance. If a subscriber has forgotten, lost, or otherwise disposed of their password, he/she may thus be unable to Log-In through the ISP for Internet access, and the subscriber may typically call a customer service representative to reset the password to a new password so that network service may be obtained.

A large ISP with many customers may thus receive many customer service calls from subscribers, and a high percentage of these customer service calls may be requests to reset forgotten passwords. A significant reduction in the number of customer service calls received to reset forgotten passwords may thus provide a significant reduction in a burden on a customer service department and costs associated therewith.

SUMMARY OF THE INVENTION

According to embodiments of the present invention, methods of resetting a password for a network service account may include redirecting the user to a password reset tool wherein the user is blocked from network access other than the password reset tool while being redirected. After redirecting the user to the password reset tool, user entry of verification information may be accepted and compared with known verification information for the user. User entry of a new password may be accepted if the verification information accepted from the user matches the known verification information for the user, and the new password may be stored as the known password for the user. For example, the network service account may be an account for Internet service.

In addition, entry of a password may be accepted, and the entered password may be compared with a known password for the user before redirecting the user to the password reset tool. Moreover, redirecting the user to the password reset tool may include redirecting the user to the password reset tool if the entered password does not match the known password. In addition, accepting entry of a password may include accepting entry of the password at a first server, and redirecting the user to a password reset tool may include redirecting the user to a second server providing the password reset tool. Accepting entry of a password may include accepting entry of the password from a remote electronic device over a coupling such as a telephone line.

In addition, network service for the user may be provided without redirecting to the password reset tool if the entered password matches the known password for the user. Redirecting the user to a password reset tool may also include redirecting the user to the password reset tool if a predetermined number of passwords have been accepted from the user during a session without matching the known password. Accepting user entry of a password may further include accepting user entry of a username and the password, and redirecting the user to a password reset tool if the password from the user does not match the known password may further include redirecting the user to the password reset tool only if the username entered by the user is a valid username.

Redirecting of the user to the password reset tool may be terminated if the verification information entered by the user does not match the known verification information. More particularly, redirecting of the user to the password reset tool may be terminated if user verification information is accepted a predetermined number of times without matching the known verification information. In addition or in an alternative, redirecting of the user to the password reset tool may be terminated if a predetermined period of time passes without accepting user verification information matching the known verification information.

After accepting entry of the new password, redirecting of the user to the password reset tool may be terminated. After accepting entry of the new password from a remote electronic device, instructions may be transmitted for the remote electronic device to automatically save the new password. Moreover, redirecting the user to the password reset tool may include tunneling the user to the password reset tool.

After redirecting the user to the password reset tool, a request for a network browser may be accepted, and responsive to accepting the request for a network browser, a password reset window may be provided including prompts for entry of the verification information. In addition or in an alternative, a request for e-mail service may be accepted after redirecting the user to the password reset tool, and a password reset e-mail may be provided including a link to a password reset window including prompts for entry of the verification information responsive to accepting the request for e-mail service. Access to all e-mails other than the password reset e-mail may also be blocked responsive to accepting the request for e-mail.

According to additional embodiments of the present invention, a network service system may provide access to a data network for a user having a network service account therewith. More particularly, the network service system may include a password reset tool configured to accept redirection of a user thereto. When the user is being redirected, the user may be blocked from network access other than the password reset tool. The password reset tool may also be configured to accept user entry of verification information after redirecting the user to the password tool, and to compare the verification information from the user with known verification information for the user. User entry of a new password may be accepted if the verification information accepted from the user matches the known verification information for the user, and the new password may be stored as the known password for the user.

According to still additional embodiments of the present invention, a computer program product may be configured to reset a password for a network service account, and the computer program product may include a computer useable storage medium having computer-readable program code embodied in the medium. More particularly, the computer-readable program code may include computer-readable program code that is configured to redirect the user to a password reset tool, and to block the user from network access other than the password reset tool while being redirected, and computer-readable program code that is configured to accept user entry of verification information after redirecting the user to the password reset tool.

Computer-readable program code may also be configured to compare the verification information from the user with known verification information for the user, and to accept user entry of a new password if the verification information accepted from the user matches the known verification information for the user. In addition, computer-readable program code may be configured to store the new password as the known password for the user.

DETAILED DESCRIPTION

Figure 1:
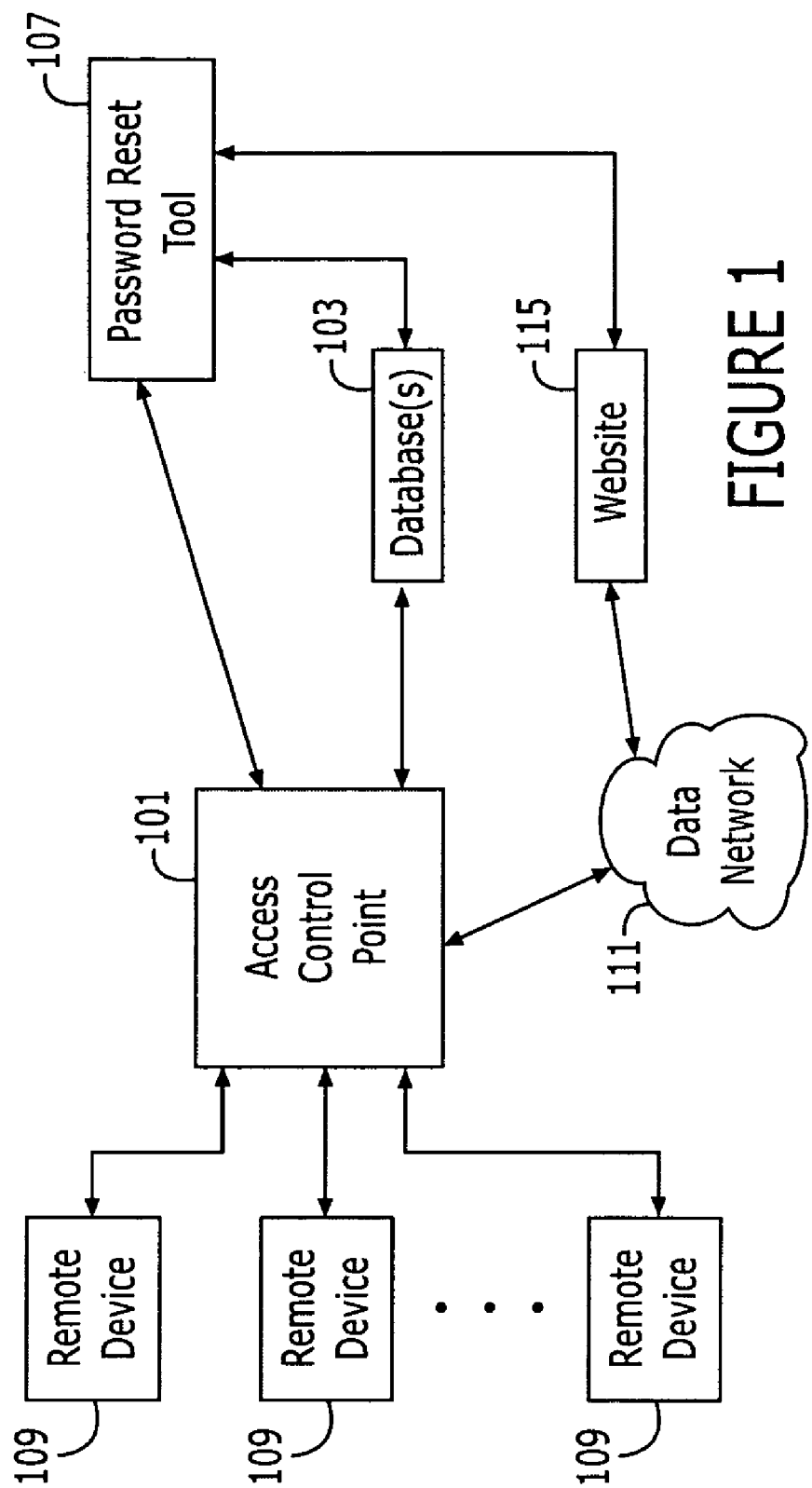
FIGS. 1 and 2 are block diagrams of systems, methods, and/or computer program products for resetting passwords according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

Referring to FIG. 1, a network service provider may operate a network service system including an access control point 101, database(s) 103, and a password reset tool 107 which may be provided within a "sandbox" network. By providing the password reset tool 107 within a "sandbox" network, a user may be redirected to the password reset tool while blocking the user from network access other than the password reset tool. The access control point 101 may control access from a plurality of remote devices 109 to a data network 111, such as the Internet. The remote devices 109 may be coupled with the access control point 101, for example, via one or more of a wired or wireless coupling such as a digital subscriber line (DSL) coupling, a dial up telephone coupling, an Integrated Services Digital Network (ISDN) coupling, a cable modem coupling, a WiFi coupling, a cellular network coupling, a Personal Communications Services (PCS) network coupling, a satellite communications coupling, an ultrawideband coupling, and/or a Bluetooth coupling, for example. The network service provider may also operate a website 115 including a home page for the network service provider. More particularly, the data network 111 may be the Internet and the network service provider may be an Internet Service Provider (ISP).

In normal operations, a subscribing user may set up a network service account with the network service provider to obtain access to the data network 111. Once an account has been established, the subscribing user may be assigned a username and a password, and account information for the user may be saved in database(s) 103. In addition to the username and password which can be used by the access control point 101 to allow or deny access to data network 111, additional account information, such as user name, address, social security number, telephone number, billing account number, personal identification number (PIN), a personal code word (such as the user's mother's maiden name), and/or additional e-mail addresses, may be stored in database(s) 103. This information or portions thereof may be used as verification information before assigning a new password.

Once a network service account has been established with the network service provider for the user, the user can use a remote device 109 to access the data network 111 through the access control point 101. More particularly, a coupling can be established between the remote device 109 and the access control point 101 using a wired and/or wireless coupling such as a digital subscriber line (DSL) coupling, a dial up telephone coupling, an Integrated Services Digital Network coupling, a cable modem coupling, a WiFi coupling, a cellular network coupling, a Personal Communications Services (PCS) network coupling, a satellite communications coupling, an ultrawideband coupling, and/or a Bluetooth coupling, for example. Responsive to an access request, the access control point 101 may prompt for entry of the username and password. For example, the access control point 101 may present a window for display at the remote device 109 wherein the window presents fields for entry of the username and password.

Once the username and password are received at access control point 101, the access control point 101 can verify that the username is a valid username and that the password is the correct password corresponding to the username using user account information stored in database(s) 103. Once the access control verifies that the username and password are correct and that the user should be allowed data network access, the access control point 101 can provide access for the remote device 109 to the data network 111.

If the user is unable to enter the correct password (for example, because the user has forgotten the password), the access control point 101 may block access to the data network 111. According to embodiments of the present invention, the password reset tool 107 can be provided as a part of a sandbox network within the network service system to allow the user to reset his/her password "on-line" without requiring a customer service call. According to additional embodiments, a user may be redirected to a sandbox network when access is denied, for example, for failure to pay for the service. The sandbox network, for example, may prompt for payment and further access may be blocked till payment is received. Accordingly, verification information requested at the sandbox network may include information effecting and/or verifying payment (i.e. such as credit card information). Demand on a customer service department may thus be reduced.

More particularly, a user having a subscription with the network service provider may attempt to access the data network 111 through the access control point 101 using a remote device 109. Because the user has a subscription, a known username for the user, a known password for the user, and known verification information (other than the username and password) for the user may be stored at database(s) 103.

Responsive to the user attempt to access the data network 111, the access control point 101 may prompt for entry of the username and password, and the username and password may be accepted by the access control point 101 from the remote device 109. Provided that a valid username has been provided, the access control point 101 can then use the username to retrieve the known password for the user from the database(s) 103. The access control point 101 can then compare the entered password with the known password for the user. If the entered password and the known password match, access to the data network 111 can be provided through the remote device 109 and the access control point 101.

If an incorrect password has been entered, however, the access control point 101 may block access to the data network 111. If a valid username has been entered but the correct password for that username has not been correctly entered, the access control point 101 may redirect the user to a password reset tool 107 to allow the user to reset the password. More particularly, the access control point 101 may allow a predetermined number of incorrect attempts (such as three incorrect attempts) before redirecting the user to the password reset tool 107. By allowing three attempts to log-in before redirecting to the password reset tool 107, the likelihood that a typographical error may result in redirection to the password reset tool 107 can be reduced. If an invalid username has been entered, the access control point 101 may block access to both the data network 111 and the password reset tool 107.

More particularly, the access control point 101 may be implemented using a Remote Access Server (RAS), and the password reset tool 107 may be implemented using a separate server within a sandbox network. Moreover, redirection of the user to the password reset tool 107 may comprise tunneling to the password reset tool 107, for example, using a Layer 2 Tunneling Protocol (L2TP). By way of example, an L2TP Access Concentrator may be used to initiate tunneling, an L2TP Network Server (LNS) may be used as a tunneling endpoint, and a content redirector may direct all Internet activity (such as web browsing and/or e-mail) to the password reset tool 107. In addition, the password reset tool may be implemented, for example, using a UNIX based server.

When the user is redirected to the password reset tool 107, the user may be blocked from network access other than the password reset tool 107. After redirecting the user to the password reset tool 107, the entry of verification information from the user may be accepted by the password reset tool 107. As discussed above, known verification information for a subscribing user may be stored in database(s) 103. More particularly, verification information for a user may include a social security number (or portion thereof), a personal identification number (PIN), a personal code word (such as the user's mother's maiden name), a billing code (that may be provided on a bill from the network service provider), and/or any other information that could be used to authenticate the user before allowing the user to change his/her password.

Once the verification information has been entered by the user, the password reset tool 107 may compare the verification information from the user with the known verification information from the database(s) 103. If the verification information accepted from the user matches the known verification information for the user, the password reset tool 107 may accept entry of a new password for the user. In addition, the password reset tool 107 may transmit a message to the user including requirements, security standards, and/or formatting rules for the new password to be entered. Once the new password has been accepted, the password reset tool 107 may store the new password as the known password for the user in the database(s) 103. Moreover, the user may be required to enter the same new password twice to ensure that the correct new password is entered.

Redirection of the user to the password reset tool 107 may be terminated if the user is not authenticated using the verification information. For example, redirection of the user to the password reset tool 107 may be terminated if the verification information entered by the user does not match the known verification information. More particularly, redirection of the user to the password reset tool 107 may be terminated if user verification information is accepted a predetermined number of times (such as twice) without matching the known verification information. In an alternative or in addition, redirection of the user to the password reset tool 107 may be terminated if a predetermined period of time passes without accepting user verification information matching the known verification information. By requiring that the authentication occurs within a predetermined period of time and/or within a predetermined number of attempts, the likelihood that a password is changed by someone other than the correct user can be reduced. If redirection is terminated without successfully updating the password, the password reset tool 107 may transmit a message to the user to call customer service to reset the password.

In addition or in an alternative, if the user fails to enter the verification information a predetermined number of times, the password reset tool may provide access to an on-line help desk. Accordingly, the network service provider may provide on-line help at a lower cost than call-in help. Moreover, access to the on-line help desk may be filtered by forcing users to attempt password resets on their own via the password reset tool before providing the on-line help desk.

Once the new password has been accepted, redirection of the user to the password reset tool can be terminated, and the user may be informed that some period of time (for example, 15 minutes) may be needed before the system databases can be updated with the new password. Accordingly, once the user is redirected to the password reset tool 107, the user may be restricted from any other network access until the redirection is terminated and the user makes another attempt to log-in at the access control point 101. The password reset tool 107 may in an alternative provide a graceful disconnect so that the user is not required to log-in at the access control point 101 after resetting the password.

Moreover, once the new password has been accepted, the password reset tool 107 may transmit a message instructing the user to manually update the new password at the remote device 109 and/or any other user equipment. In an alternative, the password reset tool may transmit instructions for the remote device 109 to automatically update the new password at the remote device 109. For example, the password reset tool 107 may "push" desktop applications to automate customer actions that may be required to update the remote device 109, such as a desktop system, with the new password. The user may also be given the opportunity to accept or reject any desktop application that has been "pushed" to the remote device 109. Moreover, any such desktop application may be configured to update the new password in all user equipment and/or applications using the password, such as a DSL modem, a DSL router, a browser, and/or an e-mail account log-in (i.e. Microsoft Outlook or Outlook Express).

When the user is redirected to the password reset tool 107, all user queries can be redirected to password reset operations. For example, if the user initiates a request for network browser operations while redirected to the password reset tool, the password reset tool 107 may respond with a window including prompts for entry of verification information. If another network address is requested by the user, the password reset tool may only provide the window with the prompts for entry of verification information. In an alternative or in addition, if the user attempts to open an e-mail program while redirected to the password reset tool, the password reset tool may provide only one e-mail with a link to a window including prompts for entry of verification information. Moreover, access to all other e-mails other than the password reset e-mail may be blocked by the password reset tool.

When a new password is assigned, the new password may be assigned as both a point-to-point protocol (PPP) log-in password used to obtain access to the data network 111 through the access control point 101. The new password may also be designated as a log-in password for a primary e-mail address associated with the user account. Passwords for secondary e-mail addresses associated with the user account may remain unchanged. According to particular embodiments of the present invention, the log-in password used to obtain access to the data network and the log-in password for a primary e-mail address may be required to be the same responsive to a user change of a log-in password using a password reset tool according to embodiments of the present invention. In addition or in an alternative, different passwords used to log-in to the data network and to log-in for a primary e-mail address may be provided by a customer service representative of the network service provider responsive to a user request.

In addition, a user may correctly enter the correct password and user name thereby obtaining access to the data network 111 through the access control point 101. Once on the data network 111, the user may wish to voluntarily change a log-in password used at the control access point 101, and the network service provider may facilitate such a voluntary password change using a website 115 and the password reset tool 107. More particularly, the website 115 may include a password reset page that redirects the user to the password reset tool 107. Because the correct username and password have already been entered to obtain access to the data network 111, the user may not be required to enter verification information when voluntarily requesting a new password through the website 115. Accordingly, different instructions, windows, and/or requirements may be provided to a user changing a password from the website 115 as opposed to a user changing a password because of redirection/tunneling from the access control point 101 due to a log-in failure.

Figure 2:
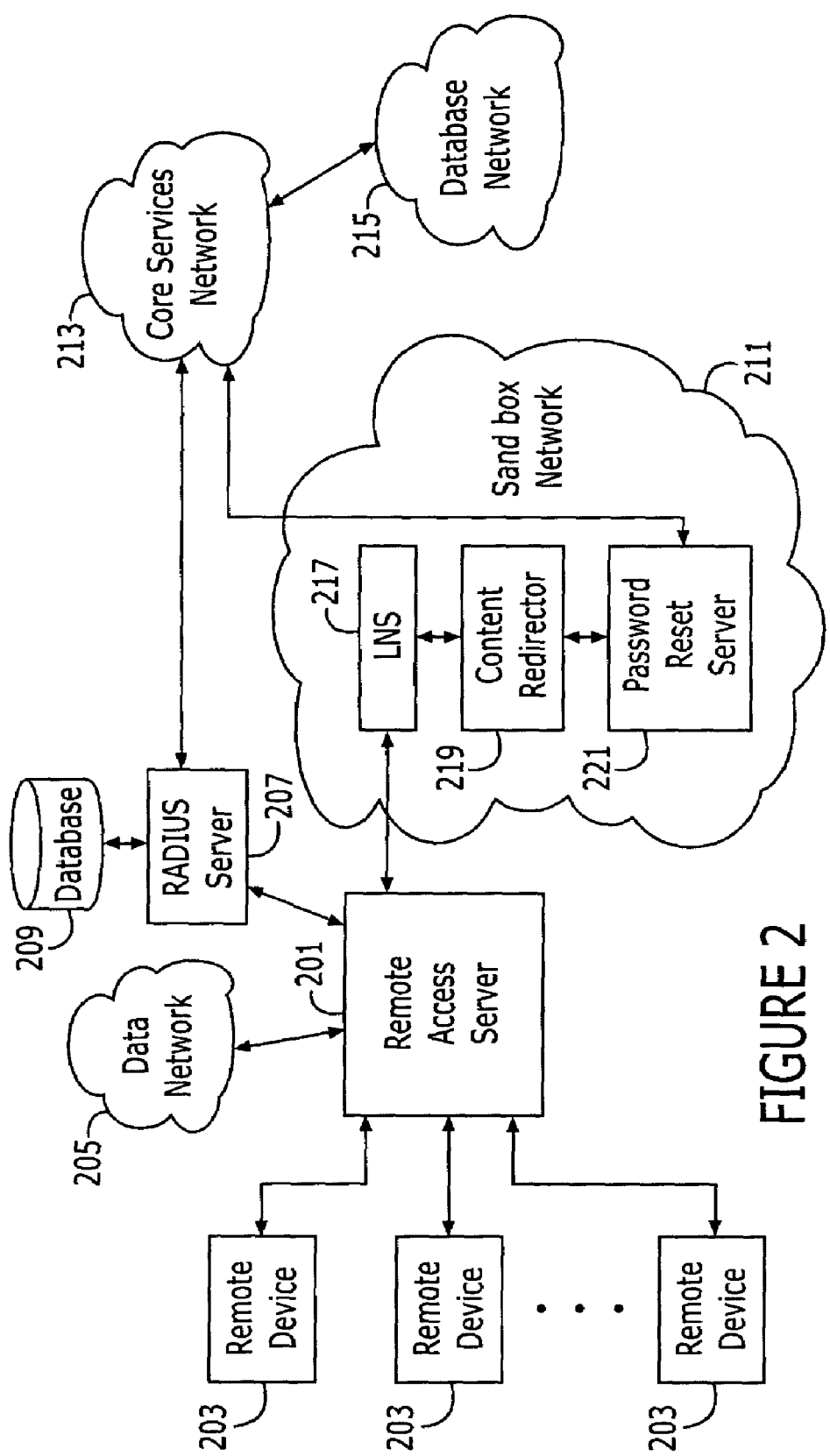

According to additional embodiments of the present invention illustrated in FIG. 2, a network service provider (such as an Internet Service Provider or ISP) may operate a network service system including a remote access server (RAS) 201 providing an access control point between remote devices 203 and a data network 205. The network service system may also include a remote access dial in user authentication (RADIUS) server 207 and an database 209 (such as an Oracle database) used to authenticate remote device users requesting access to the data network 205. In addition, the network service system may include a sandbox network 211 to reset passwords, a core services network 213 to coordinate system operations, and a database network 215 to support other system operations.

The sandbox network 211 may include an L2TP Network Server (LNS) 217, a content redirector 219, and a password reset server 221 that may be implemented using the UNIX operating system. The database network 215 may include a plurality of databases used by various components of the network service system, such as a master customer database (MCDB), a customer information database (CRIS), a social security number database, a database of customer names, a database of customer billing numbers, a database of customer personal identification numbers, and/or a database of customer code words. A plurality of these databases and or other databases may also be implemented in one or more relational databases. Moreover, the oracle database 209 and portions or all of the database network 215 may be integrated in one or more database networks for the network service system, and/or portions thereof may be distributed throughout the network service system.

When a subscribing user attempts to obtain network service using a remote device 203, the user may attempt to log-in through the remote access server 201. More particularly, a username and password for the user may be entered, the remote access server 201 may compare the entered username and password with known usernames and passwords from the (RADIUS) server 207 and a database 209, such as an oracle database. If there is a match of the entered and known usernames and passwords, access to the network 205 may be provided through the remote device 203 and the remote access server 201.

If an incorrect username and/or password is entered a predetermined number of times (such as three times), access to the network 205 may be blocked, and the remote access server 201 may act as an L2TP Access Concentrator (LAC) to build an L2TP Tunnel from the remote device 203 to the LNS 217. Moreover, the LNS 217 may query the RADIUS server 207, and if the entered username does not match a known username at the final allowed log-in attempt, the LNS 217 may terminate further connection to the network service system. If the entered username on the final log-in attempt matches a known username, but the entered password does not match the known password, the LNS 217 may allow access to the sandbox network 211. More particularly, the remote access server 201 may act as a L2TP Access Concentrator (LAC) to build an L2TP Tunnel from the remote device 203 to the LNS 217. The LNS 217 may then terminate the tunnel from the remote device 203 to the sandbox network 211 and establish a point-to-point protocol (PPP) coupling with the remote device 203. The LNS 217 may block completion of a tunnel from the remote device 203 if the last entered username does not match a known username from the RADIUS server 207 and database 209.

The content redirector 219 (such as an Alteon Content Redirector) may be used to redirect all Web (http/https) and/or e-mail (POP) traffic to the password reset server 221. Accordingly, once the user has been tunneled to the sandbox network 211, any request for a web address may be directed to a password reset window generated by the password reset server 221, and any attempt to use e-mail may result in a single new e-mail being provided in the user's in-box with directions to reset the password and a link to the password reset window generated by the password reset server 221. Access to other new e-mails from the network service system may be blocked.

The password reset window from the password reset server 221 may thus be presented to the user at the remote device 203 responsive to a failed attempt to log-in at the remote access server 201. Moreover, the password reset window may include fields for user entry of verification information (other than the username and password) that can be used to confirm the identity of the user. The verification information, for example, may include one or more of a social security number (or portion thereof), a personal identification number (PIN), a personal code word (such as the user's mother's maiden name), a billing code (that may be provided on a bill from the network service provider), and/or any other information that could be used to authenticate the user before allowing the user to change his/her password. One or more of these items of verification information and/or other items of verification information may be required to provide a desired level of security.

The verification information entered by the user can then be compared to the known verification information from the database network 215 and/or the database 209. If the verification information has been correctly entered, the password reset server 221 may query for and accept entry of a new password for the user. In addition, the password reset server 221 may require that the new password be entered twice to ensure that the new password has not been entered incorrectly. Once the new password has accepted by the password reset server 221, the new password can be forwarded to the database network 215, and/or database 209 so that the new password is updated for the user in all network service system databases.

The password reset server 221 can also transmit instructions for display at the remote device 203 instructing the user to update the new password in user equipment and/or applications. In an alternative, the password reset server 221 may push applications to the remote device to automatically update user equipment such as a DSL modem, a DSL router, a browser, and/or an e-mail account log-in (i.e. Microsoft Outlook or Outlook Express), and the user may either accept or reject the automatic update application.

Once the new password has been accepted by the password reset server 221, the remote device 203 may be decoupled from the remote access server 201, and another log-in may be required to gain access to the network 205 through the remote access server 201. Prior to decoupling the remote device 203, the user may be informed that some period of time (such as fifteen minutes) may be required before the user can log-in with the new password. In an alternative, once the new password has been accepted, the tunneling from the remote device to the sandbox network 211 may be terminated, and access to the network 205 may be provided through the remote device 203 and the remote access server 201 without requiring a log-in operation.

During password reset operations, tunneling to the sandbox network 211 may be terminated if correct verification information is not entered. For example, tunneling of the user to the sandbox network 211 may be terminated if user verification information for the user is accepted a predetermined number of times (such as twice) without matching the known verification information. In an alternative or in addition, tunneling of the user to the sandbox network 211 may be terminated if a predetermined period of time passes without accepting user verification information matching the known verification information. If tunneling is terminated without successfully updating the password, the password reset server 221 may transmit a message to the user to call customer service to reset the password. In an alternative, the password reset server 211 may provide an on-line help desk within the sandbox network 211.

Figure 3:
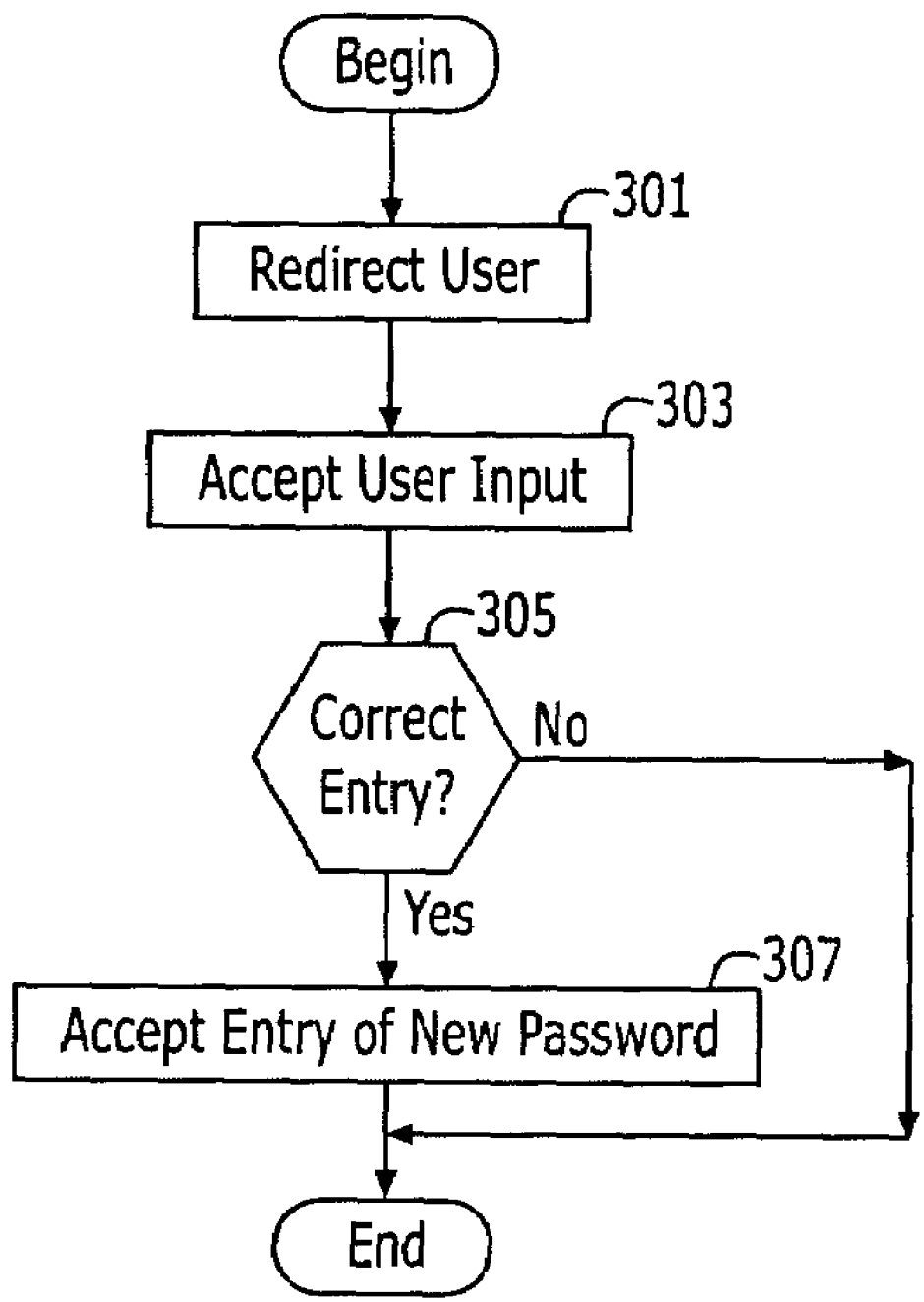
FIGS. 3 and 4 are flow charts of operations that may be performed to reset passwords according to some embodiments of the present invention.

FIG. 3 is a flow chart of operations that may be performed to reset a network access password according to some embodiments of the present invention. These operations may be provided, for example, by the network service systems of FIGS. 1 and/or 2.

Referring now to FIG. 3, a user of a network service system may be redirected to a password reset tool of the network service system at block 301 if a new password is desired for the user. By way of example, the user may be voluntarily redirected to the password reset tool responsive to a user request at a website for the network service provider. In an alternative, the user may be involuntarily redirected to the password reset tool after a predetermined number of failed attempts by the user to log-in to the network service system. Moreover, the user may be blocked from network access other than the password reset tool while being redirected.

The network service system may then accept user input of verification information at block 303. The verification information, for example, may be a social security number (or a portion thereof), a personal identification number (PIN), a personal code word (such as the user's mother's maiden name), a billing code (that may be provided on a bill from the network service provider), and/or any other information that could be used to authenticate the user before allowing the user to change his/her password. By way of example, the network service system may query for input of the verification information by providing the user with instructions to enter the verification information and/or with field(s) for entry thereof.

The password reset tool may then verify that the required verification information has been correctly entered at block 305. If the verification information is correctly entered at block 305, the password reset tool may accept entry of a new password from the user at block 307. By way of example, the password reset tool may query for input of the new password by providing the user with instructions to enter the new password and/or a field(s) for entry thereof. Once the new password has been accepted, the network service system may store the new password as a known password for the user for future use. In addition, a session with the user may be terminated, and the user may need to subsequently log-in with the new password to obtain access to the data network. In an alternative, the network service system may provide user access to the data network without requiring a subsequent log-in with the new password.

At block 305, the password reset tool may allow a predetermined number of attempts to enter the correct verification information, and/or the password reset tool may allow a predetermined period of time within which the user must enter the verification information. If the user exceeds the predetermined number of attempts without entering the correct verification information and/or the user exceeds the predetermined period of time allowed to enter the correct verification information at block 305, the user session may be terminated without resetting the password.

Figure 4:
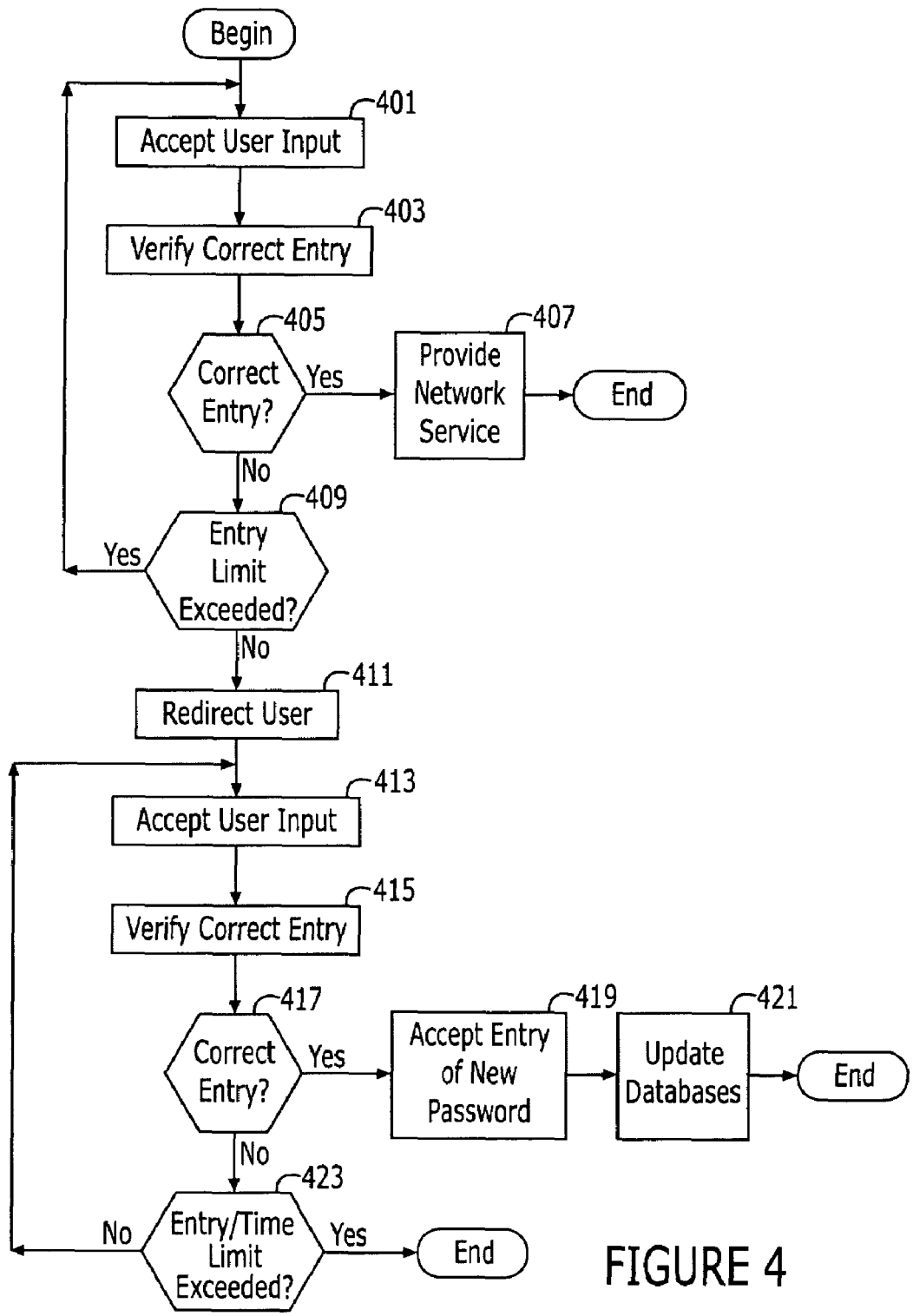

FIG. 4 is a flow chart of operations that may be performed to reset a network access password according to additional embodiments of the present invention. These operations may be provided, for example, by the network service systems of FIGS. 1 and/or 2.

Referring now to FIG. 4, a user of a network service system may be required to log-in before data network access (such as Internet access) is allowed, and a log-in procedure may require the user to correctly enter a username and password. User entry of a username and password may be accepted at block 401, and the username and password entered by the user may be verified at block 403. If the user name and password are correctly entered at block 405, the network service system may provide data network service for the user at block 407. If the username and password are not correctly entered at block 405, the network service system may allow a predetermined number of attempts (such as three) at block 409 to correctly enter the username and password. By allowing at least two attempts to enter the username and password, the likelihood of initiating password reset operations due to a typographical error by the user may be reduced.

If the predetermined number of attempts have been exceeded at block 409 without correctly entering the username and password, the user may be redirected to a password reset tool of the network service system at block 411. In addition, the user may be blocked form network access other than the password reset tool while being redirected to the password reset tool. More particularly, the user may be redirected by tunneling from a first server of the network service system providing log-in services to a second server providing password reset service according to the Layer 2 Tunneling Protocol (L2TP). Before redirecting the user to the password reset tool, the network service provider may verify that the last username entered by the user is a valid username. If the last username entered by the user is not a valid username, the user may be blocked from redirection.

The password reset tool may accept entry of user verification information at block 413. The verification information, for example, may be a social security number (or a portion thereof), a personal identification number (PIN), a personal code word (such as the user's mother's maiden name), a billing code (that may be provided on a bill from the network service provider), and/or any other information that could be used to authenticate the user before allowing the user to change his/her password. By way of example, the network service system may query for input of the verification information by providing the user with instructions to enter the verification information and/or with field(s) for entry thereof.

Correct entry of the user verification information may be verified at block 415, and if the verification information has been correctly entered at block 417, the password reset tool may accept entry of a new password at block 419. The password reset tool, for example, may provide instructions and/or fields for entry of the new password, and once the new password has been entered and accepted, the network service system may update databases with the new password at block 421. After accepting the new password, the network service system may terminate the session with the user so that the user is required to log-in with the new password before obtaining access to the data network. In an alternative, the network service system may provide user access to the data network without requiring the user to log-in with the new password.

If the verification information entered by the user is incorrect at block 417, the password reset tool may determine at block 423 if a limit of time and/or incorrect entries has been exceeded. The password reset tool, for example, may allow only a predetermined number of incorrect user entries of the verification information and/or only a predetermined period of time within which the correct verification information can be entered. If a predetermined number of incorrect entries has not been exceeded and/or a predetermined period of time has not been exceeded at block 423, another input of user verification information may be accepted at block 413.

If a predetermined number of incorrect entries has been exceeded and/or a predetermined period of time has been exceeded at block 423, further attempts to reset the password using the password reset tool may be blocked. Once the user is blocked from further attempts to enter the verification information, the session with the user may be terminated. In an alternative, the user may be redirected to an on-line help desk.

The present invention is described above with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings and specification, there have been disclosed embodiments of the invention and, although specific terms are employed, they are used in a generic and descriptive sense only and not for purposes of limitation, the scope of the invention being set forth in the following claims.

The invention claimed is:

1. A method of resetting a password for a network service account, the method comprising:

accepting entry of a password at a first server from an electronic device wherein the electronic device is remote from the first server;

comparing the entered password with a known password;
after comparing the entered password with the known password, redirecting a user of the electronic device from the first server to a second server providing a password reset tool if the entered password does not match the known password, wherein the user of the electronic device is blocked from network access other than the password reset tool while being redirected to the second server, wherein the second server is separate from the first server;
after redirecting the user of the electronic device to the second server providing the password reset tool, accepting user entry of verification information at the second server;
comparing the verification information from the user with known verification information for the user;
accepting user entry of a new password if the verification information accepted from the user matches the known verification information for the user; and
storing the new password as the known password for the user.

2. A method according to claim 1 wherein accepting entry of the password from the electronic device comprises accepting entry of the password from the electronic device over a telephone line.

3. A method according to claim 1 further comprising:
providing network service for the user without redirecting to the second server providing the password reset tool if the entered password matches the known password for the user.

4. A method according to claim 1 wherein redirecting the user to the second server providing the password reset tool comprises redirecting the user to the second server providing the password reset tool if a predetermined number of passwords have been accepted from the user during a session without matching the known password.

5. A method according to claim 1 wherein accepting entry of a password further comprises accepting user entry of a username and the password from the electronic device, and wherein redirecting the user of the electronic device to the password reset tool if the password from the electronic device does not match the known password further comprises redirecting the user of the electronic device to the second server providing the password reset tool only if the username from the electronic device is a valid username.

6. A method according to claim 1 further comprising:
terminating redirecting of the user of the electronic device to the second server providing the password reset tool if the verification information entered by the user does not match the known verification information.

7. A method according to claim 1 further comprising:
terminating redirecting of the user of the electronic device to the second server providing the password reset tool if user verification information is accepted a predetermined number of times without matching the known verification information.

8. A method according to claim 1 further comprising:
terminating redirecting of the user of the electronic device to the second server providing the password reset tool if a predetermined period of time passes without accepting user verification information matching the known verification information.

9. A method according to claim 1 further comprising:
after accepting entry of the new password, terminating redirecting of the user of the electronic device to the second server providing the password reset tool.

10. A method according to claim 1 further comprising:
after accepting entry of the new password from the remote electronic device, transmitting instructions for the remote electronic device to automatically save the new password.

11. A method according to claim 1 wherein redirecting the user of the electronic device to the second server providing the password reset tool comprises tunneling the user from the first server to the second server providing the password reset tool.

12. A method according to claim 1 further comprising:
after redirecting the user of the electronic device to the second server providing the password reset tool, accepting a request for a network browser at the second server; and
responsive to accepting the request for an network browser, providing a password reset window including prompts for entry of the verification information while the user of the electronic device is blocked from network access other than the password reset tool wherein the password reset window is provided from the second server at the electronic device remote from the second server.

13. A method according to claim 1 further comprising:
after redirecting the user of the electronic device to the second server providing the password reset tool, accepting a request for e-mail service at the second server from the electronic device; and
responsive to accepting the request for e-mail service, providing a password reset e-mail from the second server for the user including a link to a password reset window including prompts for entry of the verification information while the user of the electronic device is blocked from network access other than the password reset tool.

14. A method according to claim 13 further comprising:
responsive to accepting the request for e-mail, blocking access of the user of the electronic device to all e-mails other than the password reset e-mail.

15. A method according to claim 1 wherein the network service account comprises an Internet service account.

16. A method according to claim 1 wherein the electronic device is remote from both of the first and second servers.

17. A method according to claim 1 wherein the second server comprises an element of a sandbox network and wherein the first server is outside the sandbox network.

18. A network service system that provides access to a data network for a user having a network service account therewith, the system comprising:
an access control point implemented on a first server configured to accept entry of a password from an electronic device remote from the first server as a condition of providing access to the data network, to compare the entered password with a known password for the user using the electronic device, and to redirect the user of the electronic device if the entered password does not match the known password; and
a password reset tool implemented on a second server separate from the first server, wherein the password reset tool is configured to accept redirection of the user of the electronic device from the access control point implemented at the first server to the password reset tool implemented at the second server, wherein the user of the electronic device is blocked from network access other than the password reset tool implemented at the second server while being redirected, the password reset tool implemented at the second server being further configured to accept user entry of verification information after redirecting the user of the electronic device to the password reset tool, to compare the verification information from the user of the electronic device with known verification information for the user of the electronic device, to accept user entry of a new password if the verification information accepted from the user of the electronic device matches the known verification information for the user of the electronic device, and to store the new password as the known password for the user of the electronic device.

19. A network service system according to a claim 18 wherein the access control point is configured to accept entry of the password from the electronic device over a telephone line.

20. A network service system according to claim 18 wherein the access control point is configured to provide network service for the user of the electronic device without redirecting to the password reset tool if the entered password matches the known password for the user.

21. A network service system according to claim 18 wherein the access control point is configured to redirect the user to the password reset tool if a predetermined number of passwords have been accepted from the user during a session without matching the known password.

22. A network service system according to claim 18 wherein the access control point is configured to accept user entry of a username and the password, and to redirect the user to the password reset tool only if the username entered by the user is a valid username.

23. A network service system according to claim 18 wherein the password reset tool is configured to terminate redirection of the user to the password reset tool if the verification information entered by the user does not match the known verification information.

24. A network service system according to claim 18 wherein the password reset tool is configured to terminate redirection of the user to the password reset tool if user verification information is accepted a predetermined number of times without matching the known verification information.

25. A network service system according to claim 18 wherein the password reset tool is configured to terminate redirection of the user to the password reset tool if a predetermined period of time passes without accepting user verification information matching the known verification information.

26. A network service system according to claim 18 wherein the password reset tool is configured to terminate redirection of the user to the password reset tool after accepting entry of the new password.

27. A network service system according to claim 18 wherein the password reset tool is configured to transmit instructions for the remote electronic device to automatically save the new password after accepting entry of the new password from the remote electronic device.

28. A network service system according to claim 18 wherein the access control point implemented at the first server is configured to redirect the user of the electronic device by tunneling the user of the electronic device to the password reset tool, and wherein the password reset tool implemented at the second server is configured to accept tunneling of the user of the electronic device from the access control point.

29. A network service system according to claim 18 wherein the password reset tool implemented at the second server is configured to accept a request for a network browser after accepting redirection of the user of the electronic device, and to provide a password reset window including prompts for entry of the verification information responsive to accepting the request for an network browser while the user of the electronic device is blocked from network access other than the password reset tool wherein the password reset window is provided from the second server at the electronic device remote from the second server.

30. A network service system according to claim 18 wherein the password reset tool is configured to accept a request for e-mail service after redirecting the user to the password reset tool implemented at the second server, and to provide a password reset e-mail for the user of the electronic device including a link to a password reset window including prompts for entry of the verification information responsive to accepting the request for e-mail service while the user of the electronic device is blocked from network access other than the password reset tool.

31. A network service system according to claim 30 wherein the password reset tool is configured to block access of the user of the electronic device to all e-mails other than the password reset e-mail responsive to accepting the request for e-mail.

32. A network service system according to claim 18 wherein the network service account comprises an Internet service account.

33. A network service system according to claim 18 wherein the electronic device is remote from both of the first and second servers.

34. A network service system method according to claim 18 wherein the second server comprises an element of a sandbox network and wherein the first server is outside the sandbox network.

35. A computer program product configured to reset a password for a network service account, the computer program product comprising a computer useable storage medium having computer-readable program code embodied in the medium, the computer-readable program code comprising:

computer-readable program code that is configured to accept entry of a password at a first server from an electronic device wherein the electronic device is remote from the first server; and computer-readable program code that is configured to compare the entered password with a known password, wherein redirecting the user to the password reset tool comprises redirecting the user to the password reset tool if the entered password does not match the known password;

computer-readable program code that is configured to redirect a user of the electronic device from the first server to a second server providing a password reset tool if the entered password does not match the known password after comparing the entered password with the known password, and to block the user of the electronic device from network access other than the password reset tool while being redirected to the second server, wherein the second server is separate from the first server;

computer-readable program code that is configured to accept user entry of verification information at the second server after redirecting the user of the electronic device to the second server providing the password reset tool;

computer-readable program code that is configured to compare the verification information from the user with known verification information for the user;

computer-readable program code that is configured to accept user entry of a new password if the verification information accepted from the user matches the known verification information for the user; and computer-readable program code that is configured to store the new password as the known password for the user.

36. A computer program product according to claim 35 wherein accepting user entry of the password from the electronic device comprises accepting entry of the password from the electronic device over a telephone line.

37. A computer program product according to claim 35 further comprising:

computer-readable program code that is configured to provide network service for the user without redirecting to the second server providing password reset tool if the entered password matches the known password for the user.

38. A computer program product according to claim 35 wherein redirecting the user to the second server providing the password reset tool comprises redirecting the user to the second server providing the password reset tool if a predetermined number of passwords have been accepted from the user during a session without matching the known password.

39. A computer program product according to claim 35 wherein accepting entry of a password further comprises accepting entry of a username and the password from the electronic device, and wherein redirecting the user of the electronic device to the password reset tool if the password from the electronic device does not match the known password further comprises redirecting the user of the electronic device to the second server providing the password reset tool only if the username from the electronic device is a valid username.

40. A computer program product according to claim 35 further comprising:

computer-readable program code that is configured to terminate redirecting of the user of the electronic device to the second server providing the password reset tool if the verification information entered by the user does not match the known verification information.

41. A computer program product according to claim 35 further comprising:

computer-readable program code that is configured to terminate redirecting of the user of the electronic device to the second server providing the password reset tool if user verification information is accepted a predetermined number of times without matching the known verification information.

42. A computer program product according to claim 35 further comprising:

computer-readable program code that is configured to terminate redirecting of the user of the electronic device to the second server providing the password reset tool if a predetermined period of time passes without accepting user verification information matching the known verification information.

43. A computer program product according to claim 35 further comprising:

computer-readable program code that is configured to terminate redirecting of the user of the electronic device to the second server providing the password reset tool after accepting entry of the new password.

44. A computer program product according to claim 35 further comprising:

computer-readable program code that is configured to transmit instructions for the remote electronic device to automatically save the new password after accepting entry of the new password from the remote electronic device.

45. A computer program product according to claim 35 wherein redirecting the user of the electronic device to the second server providing the password reset tool comprises tunneling the user from the first server to the second server providing the password reset tool.

46. A computer program product according to claim 35 further comprising:

computer-readable program code that is configured to accept a request for a network browser at the second server after redirecting the user of the electronic device to the second server providing the password reset tool; and computer-readable program code that is configured to provide a password reset window including prompts for entry of the verification information responsive to accepting the request for a network browser while the user of the electronic device is blocked from network access other than the password reset tool wherein the password reset window is provided from the second server at the electronic device remote from the second server.

47. A computer program product according to claim 35 further comprising:

computer-readable program code that is configured to accept a request for e-mail service at the second server from the electronic device after redirecting the user of the electronic device to the second server providing the password reset tool; and computer-readable program code that is configured to provide a password reset e-mail from the second server for the user including a link to a password reset window including prompts for entry of the verification information responsive to accepting the request for e-mail service while the user of the electronic device is blocked from network access other than the password reset tool.

48. A computer program product according to claim 47 further comprising:

computer-readable program code that is configured to block access of the user of the electronic device to all e-mails other than the password reset e-mail responsive to accepting the request for e-mail.

49. A computer program product according to claim 35 wherein the network service account comprises an Internet service account.

50. A computer program product according to claim 35 wherein the electronic device is remote from both of the first and second servers.

51. A computer program product according to claim 35 wherein the second server comprises an element of a sandbox network and wherein the first server is outside the sandbox network.

* * * * *

UNITED STATES PATENT AND TRADEMARK OFFICE
CERTIFICATE OF CORRECTION

| | |
|---|---|
| PATENT NO. | : 7,353,536 B1 |
| APPLICATION NO. | : 10/669399 |
| DATED | : April 1, 2008 |
| INVENTOR(S) | : Morris et al. |

It is certified that error appears in the above-identified patent and that said Letters Patent is hereby corrected as shown below:

Column 13, Claim 5, Line 38:   Please delete "accepting user entry of a"
                               To read -- accepting entry of a --

Signed and Sealed this

Twenty-ninth Day of July, 2008

JON W. DUDAS
*Director of the United States Patent and Trademark Office*